Jan. 25, 1955 W. H. BURKHART 2,700,755

KEYBOARD CHECKING CIRCUIT

Filed Nov. 9, 1951

INVENTOR
WILLIAM H. BURKHART
BY William L. Glover
AGENT 2,700,755
Patented Jan. 25, 1955

2,700,755

KEYBOARD CHECKING CIRCUIT

William H. Burkhart, East Orange, N. J., assignor to Monroe Calculating Machine Company, Orange, N. J., a corporation of Delaware Application November 9, 1951, Serial No. 255,711

8 Claims. (Cl. 340—149)

Figures 1, 2, 3:
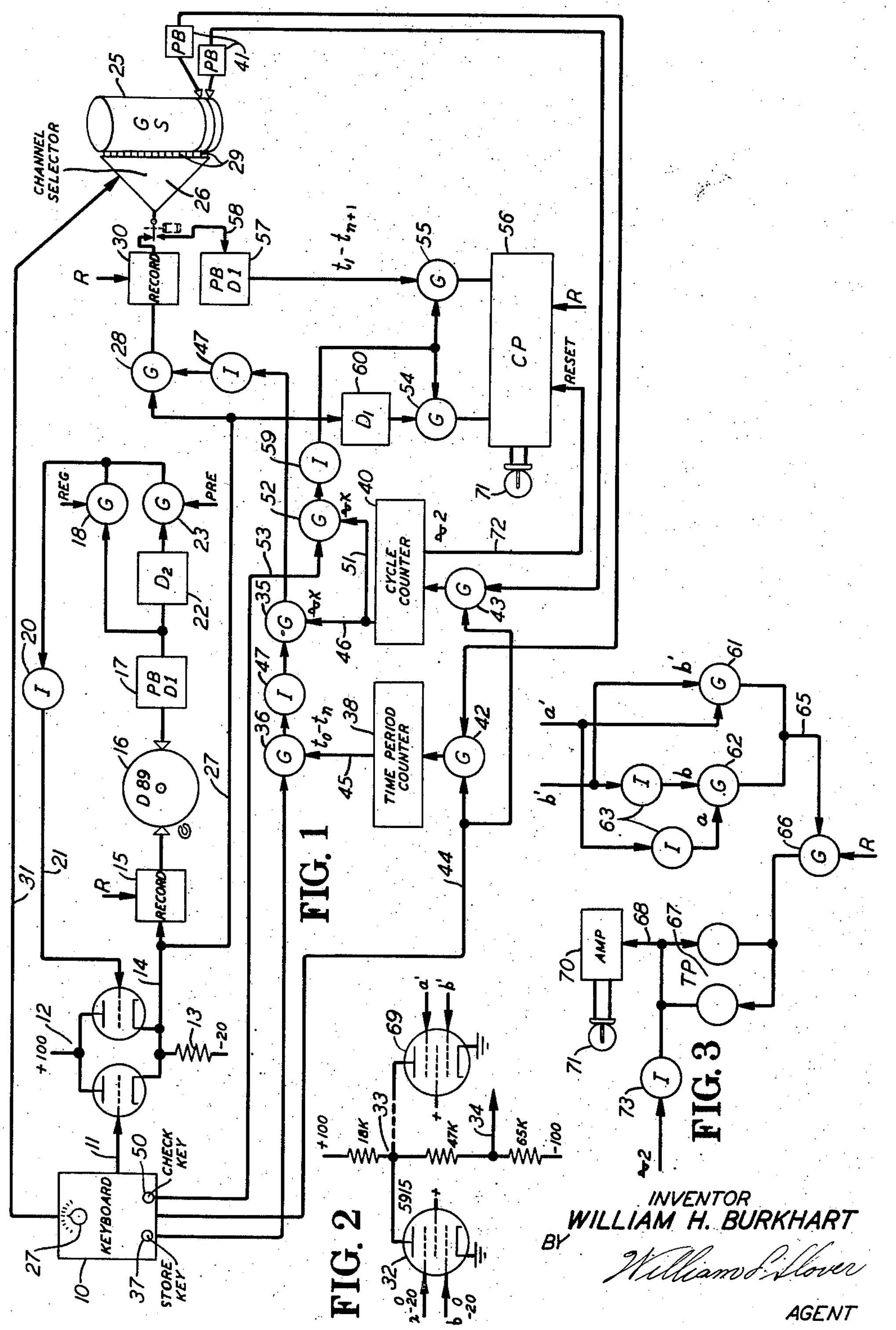

This invention relates to keyboard controlled computers in general, and more particularly to keyboard setup checking means therefor.

In keyboard controlled computers, particularly those wherein the keyboard is of the ten key variety, the incidence of errors in the keyboard setups must be carefully controlled. For example, the entry of one erroneous digit through the keyboard may, during the course of numerous automatic operations of the computer, cause the latter to arrive at an erroneous result which cannot readily be checked and which may, therefore, be taken for the true result.

The principal object of the invention, therefore, is the provision of means for checking keyboard setups before the latter are effective to control the computer.

According to a specific instance of the invention, the several related setups of a keyboard of the ten key type are effective to transmit code signals to an intermediate storage device from whence they are eventually transmitted to a permanent general storage device on depression of a special "store" key. Following depression of the "store" key the keyboard is again manipulated to re-enter the information into the intermediate storage device. However, instead of depressing the "store" key again, a special "check" key is depressed and routes the information from the intermediate storage device to a comparison device wherein it is compared with the information which was first transmitted to the general storage device. If any non-comparisons are found, the comparison device effects the illumination of a lamp or operates some other indicator which notifies the operator that an error has been made. Of course, if no error has been made, the operator of the computer is free to enter further information into the keyboard, but if an error has been made, the operator must clear the erroneous information from the general storage device.

Other objects and features of the invention will become apparent from the following description when read in the light of the attached drawings of which Fig. 1 is a schematic block wiring diagram of the means of the invention.

Fig. 2 is a schematic wiring diagram of a portion of the means of the invention shown in block form in Fig. 1 and Fig. 3 is an expanded block diagram of a portion of Fig. 1.

Referring to Fig. 1, the keyboard of the invention is illustrated diagrammatically at 10 and may be of any suitable sort which on depression of a digit key transmits over a line 11 a burst of positively directed pulses indicative of the digits 1–9 in the serial coded decimal (1, 2, 4, 8) or any other appropriate system of notation. The serial coded decimal form of notation is well known and need not be discussed herein except to state that any digit 1–9 may be represented by one or a combination of four pulses which are transmitted over a single line during successive time or pulse periods, there being four pulse periods for each digit whether or not pulses occur during each period. Line 11 leads to an "or gate" 12 which consists of a pair of triodes having their anodes commonly connected to a positive source of potential and their cathodes connected through a resistor 13 to a source of negative potential, say, −20 volts. Line 11 is applied to the grid of one of the triodes. An output line 14 is taken from the connected cathodes of the triodes, and when both triodes are cut off, said output line is at a low potential of approximately −20 volts. However, if either triode is made conductive as, for example, by the occurrence of a pulse on line 11, the potential of said output line rises to approximately 0 volts. Output line 14, therefore, serves to transmit pulses from the keyboard as well as pulses from another source as will be explained hereinafter. Line 14 leads into a magnetic recording circuit 15 which is jointly controlled by the pulses on said line and by record pulses R from a suitable clock device which serves to accurately time the operations of the record circuit during each time or pulse period. Record circuit 15 is associated with a rotating disc 16 having on its periphery a suitable magnetic coating adapted to have a discrete spot thereof magnetized on the occurrence of each pulse on line 14 at record time R. A playback circuit 17 is also associated with disc 16 and is controlled by the magnetized spots on the periphery thereof. Record circuit 15, disc 16 and playback circuit 17 may be identical with those disclosed in the co-pending application of William Burkhart Serial No. 228,148. Preferably, the record and playback heads of the record and playback circuits are so positioned relative to disc 16 that a delay of 89 time periods is obtained between the recording of an item of information on the disc and the playback thereof. The playback circuit 17, as disclosed in said co-pending application, effects a further delay of one time period so that the entire system effects a 90 time period delay. Conveniently, disc 16 is considered to rotate once during each 180 time period so that the 90 time period delay effected by this system actually is one-half cycle.

The output of playback unit 17 is applied to a coincidence gate 18 whose output in turn is applied to an inverter 20 which is connected to the grid of the second triode of "or gate" 12 by line 21. Assuming for the moment that gate 18 is open, then information from playback unit 17 is fed back to "or gate" 12 with the same polarity that it had had when it first reached said gate and is again applied to the record circuit 15. Obviously, an information pulse fed to record circuit 15 over line 11 during any particular time period of a cycle is fed back to the record circuit 90 time periods later, and again at the same time period during the following cycle over line 21. It will be convenient to call this mode of operation "regeneration," that is, the information originally transmitted over line 11 to the record circuit is transmitted to said record circuit over line 21 during each succeeding cycle and is recorded on the disc at exactly the same time during each succeeding cycle.

A permanent erasing magnet located between the playback and recording heads in the direction of rotation of the disc serves to eradicate the magnetized spots between successive recordings thereof.

The output of playback unit 17 is also applied to a two time period delay circuit 22 whence it is transmitted to a coincidence gate 23. The output of gate 23 is commonly applied to inverter 20 with that of gate 18. Assuming for the moment that gate 23 is open and gate 18 closed, each time information is circulated through the system it is delayed not 90 time periods but 92 time periods so that during each full cycle of the machine information is recorded on the disc four time periods later than during the preceding cycle. This arrangement is ideally adapted for use with a keyboard of the ten key type wherein one digit is entered at a time. For example, keyboard 10 may be so arranged that on depression of a digit key the pulse or pulses representative of the digit are transmitted over line 11 during time periods $t_0$, $t_1$, $t_2$, $t_3$. Thus the information transmitted during said time periods is immediately recorded on the disc and by means of the two period delay, 22 is caused to be recorded during time periods $t_4$, $t_5$, $t_6$ and $t_7$ of the next succeeding cycle, making it possible to record another digit during the time periods $t_0$, $t_1$, $t_2$ and $t_3$ of that said next following cycle. It will be convenient to call this mode of operation "precession." Preferably, keyboard 10 is so arranged that following each depression of a digit key, precession gate 23 is opened and the regeneration gate 18 is closed for one cycle, the latter gate being open at all other times. Thus information entered from the keyboard is immediately recorded on the disc during time periods $t_0$, $t_1$, $t_2$ and $t_3$, is precessed four time periods, and is recorded on the disc during time periods $t_4$, $t_5$, $t_6$ and $t_7$ of all succeeding cycles until another digit key is depressed.

Coincidence gates 18 and 23, and others to be mentioned hereinafter, may be of any suitable sort but preferably are of the pentode type shown in Fig. 2. As indicated, control potentials of 0 or −20 volts are applied to the control and suppressor grids of a pentode 32 of the type 5915 which is adapted to be cut off on application of the lower potential to either grid. Thus the tube conducts only when the potentials of both grids are high. The cathode of the pentode gate is connected to ground, the screen grid to a suitable source of positive potential, and the anode to the juncture of the two positivemost sections of a three section voltage divider 33 applied to sources of positive and negative 100 volt potentials. The voltage divider sections may have the values indicated in Fig. 2 to swing the potential of an output line 34 taken from the center tap thereof from 0 volts, when the tube is cut off, to −20 volts when the tube conducts. Obviously, in gates 18 and 23 the output signals of playback circuit 17 are applied to one grid and the precession or regeneration signal is applied to the other.

Magnetic disc 16 is an intermediate storage device which permits leisurely, serial entry of digits into the computer. When all of the digits of a number have been entered into the intermediate storage device, it is necessary that they be transmitted to a permanent general storage device which, in the present instance, is a magnetic drum 25 having on its periphery a plurality of parallel information channels, each of which may be considered as being identical with the disc 16.

In order to transmit information from disc 16 to any desired channel of drum 25, the following means are provided. Output line 14 of "or gate" 12 which controls the disc recording circuit 15, is provided with a branch 27 that is applied to a coincidence gate 31 whose output controls the operation of a record circuit 30 associated with drum 25. Record circuit 30, like circuit 15 is controlled as to timing by the record pulses R. The output of record circuit 30 is applied selectively to a series of record heads 29 each associated with a drum channel, through a channel selector pyramid 26 which may be a relay matrix or any other well known settable selection circuit. Preferably channel selector 26 is set up to select a particular channel of drum by means of a connecting cable 28 and a selector switch 27 on keyboard 10.

In order to open gate 28 at the appropriate time to transfer a number from disc 16 to drum 25, the auxiliary input of the gate is derived from a pair of serially connected coincidence gates 35 and 36 which are controlled by a "store" key 37 on keyboard 10 and by a pair of counters 38 and 40. Counter 38 counts time periods and counter 40 counts cycles, the former being advanced under control of a playback unit 41 associated with a control channel of drum 25 having a full complement of magnetized spots therein, and the latter being controlled by a playback unit 41 associated with a channel of drum 25 having but one magnetized spot therein. Both counters are also controlled from the keyboard in such manner that the playback units 41 are effective to advance them only during cycles in which a digit key is depressed. To this end, the output of the playback units 41 are applied to coincidence gates 42 and 43 which have their auxiliary inputs supplied from the keyboard through a line 44. In any suitable manner the potential of line 44 is raised from, say, −20 volts to 0 volts each time a digit key or the "store" key 37 of keyboard 10 is depressed and thus opens the gates 42 and 43.

Counters 38 and 40 may be of any suitable sort adapted to advance step by step under control of the outputs of the gates 42 and 43 and to be reset after reaching a predetermined count. In the present instance, it is desired that counters 38 and 40 open the gates 36 and 35 for time periods $t_0$–$t_n$ of cycle X to permit the passage of a number from disc 16 to drum 25 over line 27 and through gate 28. Therefore, the outputs of those stages of counter 38 which represent time periods $t_0$–$t_n$ are applied to the auxiliary input of gate 36 through line 45 and in succession maintain the latter open. Preferably, a crystal rectifier matrix or the like is inserted between counter 38 and line 45. This is so obvious an expedient, however, it is unnecessary to illustrate the same or to describe it. The number of time periods involved, is, of course, dependent on the predetermined number of digits in the numbers being handled. The number of digits being handled also determines that cycle X on which counter 40 opens gate 35. Here, the output of that stage which represents the number X is applied to the auxiliary input of gate 35 through a line 46. To obtain the proper potentials for controlling the gates 35 and 28, triode inverters 47 are inserted in their appropriate input lines.

Therefore, when all of the digits of a number have been entered onto disc 16 and cycle counter 40 stands on cycle X, the depression of store key 37 effects opening of gate 28 and the information is transferred from the disc to the appropriate channel of drum 25 during time periods $t_0$–$t_n$. Also, depression of the "store" key effects resetting of the counters to their initial conditions. This may be accomplished in any desired manner, and as it forms no part of the invention need not be described further.

According to the invention, a number thus recorded on drum 25 is again entered onto disc 16 through keyboard 10 in the same manner as described above. This time, however, a "check" key 50 on keyboard 10 rather than the "store" key 37 is depressed. Operation of "check" key 50 transfers the information from disc 16 to a comparison circuit wherein said information is compared with that previously recorded on the drum. Means to this end will now be described.

Output line 46 of cycle counter 40 which, it will be remembered, receives a high potential during the appropriate cycle X is provided with a branch 51 which is applied to a coincidence gate 52 to open the latter. The other input of said gate is connected with "check" key 50 by a line 53 which is suitably provided with a high potential (0 volts) on depression of the key. The output of gate 52 is applied to an inverter 59 whose output, in turn, is applied to one input of each of a pair of coincidence gates 54 and 55. The outputs of gates 54 and 55 are applied to a comparison circuit 56, as will be more fully described presently. The other input of gate 55 is connected to the output of a playback unit 57 which is connected to the matrix 26 by a line 58. Matrix 26 connects line 58 with the appropriate one of the recording heads 29 which, in the present instance, are used alternatively as playback heads to control playback unit 57. If desired, a switch is provided to connect record unit 30 and playback unit 57 with said heads alternatively. As described in the above cited co-pending application to William Burkhart, playback unit 57 delays information read from drum 25 one time period so that information recorded on the drum during time periods $t_0$–$t_n$ is applied to gate 55 during time periods $t_1$–$t_n+1$.

The second input of gate 54 is connected with the line 27 described above, by a one time period delay circuit 60. Therefore, information transmitted over line 27 during time periods $t_0$–$t_n$ of a given cycle is applied to gate 54 during time periods $t_1$–$t_n+1$ of that cycle.

It will be seen, therefore, that the information from disc 16 and the information from drum 25 are applied to the comparison circuit 56 synchronously.

Comparison circuit 56 is illustrated in detail in Fig. 3 and includes a pair of coincidence gates 61 and 62, to the former of which the outputs of gates 54 and 55 are applied directly as indicated at $a'$ and $b'$, and to the latter of which the inversions of the outputs of said gates are applied as indicated at $a$ and $b$. Preferably, triode inverters 63 are utilized for this purpose. The gates 61 and 62 are provided with a common output 65 which has a high potential of, say, 0 volts only when neither gate conducts. The details of this arrangement are shown in Fig. 2 wherein the anode of a pentode gate 69 is applied to the voltage divider 33 along with that of pentode 32. Obviously, output line 34 from said voltage divider 33 has a high potential only when both tubes 32 and 67 are cut off. Output line 34 of the detailed illustration of Fig. 2 and line 65 of Fig. 3 are identical. It will be understood, of course, that the gating arrangement can, if desired, be modified to produce a low output on a non-comparison.

It will readily be seen that the information fed to gates 54 and 55 from disc 16 and drum 25 in the form of positively directed pulses indicative of binary ones and low potentials (−20 volts) for binary zeros will cause either gate 61 or gate 62 to conduct whenever the information from the two sources is identical. However, should a high potential be applied to say gate 54 at the same time that a low potential is applied to gate 55, said gate 54 will have a high output and gate 55 a low output, and neither gate 61 nor gate 62 will conduct, since one of the inputs of each is low. Therefore, output line 65 of gates 61 and 62 is at the high potential of, say, 0 volts only when a non-comparison between the information contained on drum 25 and that on disc 16 is found. Output line 65 is connected to one input of a coincidence gate 66 whose other input is controlled by the pulse source which applies the record pulses R to the record circuits 15 and 30. The purpose of this is to open gate 66 only at that time during each time period when the signals from the playback units 17 and 57 are at their maxima, said signals normally not having extremely steep leading and lagging edges. It is for this reason that the described coincidence gates were chosen in the present instance rather than ones having a low output on a non-comparison. Gate 66, which conducts only on a non-comparison as mentioned above, is utilized as a puller tube to set a stable flip-flop 67 which may be of any suitable sort such as that shown in the afore cited co-pending application to William Burkhart. An output line 68 from flip-flop 67 is applied to a suitable amplifier 70 which, when operated, illuminates a lamp 71 which may be located conspicuously on the keyboard.

On the occurrence of a non-comparison between a number played back from general storage and one played from the intermediate storage device, therefor, lamp 71 is illuminated, indicating to the operator of the computer that an error has been made and that the information just recorded should be erased and re-entered into the machine. This may be done in any suitable manner such as by entering a series of zeros through keyboard 10 and recording them over the erroneous number on drum 25.

It is necessary that lamp 71 be extinguished as soon as the operation of clearing the erroneous information from drum 25 has begun. To this end, cycle counter 40 may be provided with an output line 72 from that stage which represents cycle 2. Line 72 is applied to an inverter 73 (Fig. 3) which is connected to the opposite side of trigger pair 67 and acts to reset the latter. The reason for choosing cycle 2 for resetting is that following cycle X, counter 40 normally is reset to cycle 1 to begin another round of operation. A counter reset means, however, forms no part of the present invention and need not be discussed any further.

In summation, therefore, the invention is applied to a computer having an intermediate storage device and a permanent storage device and consists of a comparison circuit, gating means for routing information from the permanent storage device to the comparison circuit and also from the intermediate storage device to said circuit at the appropriate times, and an indicator operated by said comparison circuit when the same discovers a non-comparison between the two sets of information.

While there is above described but a single embodiment of the invention, the same is capable of many modifications and changes without departing from the spirit of the invention and it is not desired, therefore, to place any limitations on the invention other than as pointed out in the following claims or as dictated by the prior art.

I claim:

1. In a computer having a keyboard, first storage device into which information is admitted through the keyboard, a second storage device, key controlled means for shifting information from the first storage device to the second storage device, a comparison circuit, key controlled means for synchronously transmitting the information in pulse form from the first and second storage devices to said comparison circuit after it has been entered into the first storage device a second time, an electronic element operated by said comparison circuit on the occurrence of a non-comparison between the information from the two sources, and an indicator operated by said electronic element.

2. In a computer having a keyboard, an intermediate storage device into which information is entered through said keyboard, and a permanent storage device into which information is shifted from said intermediate storage device, the combination of key controlled means for so shifting said information, a comparison circuit comprising a pair of coincidence gates having a common output, key controlled means for transmitting in synchronism to one of said gates a pulse representation of the information in each storage device and to the other gate an electronically inverted pulse representation of said information, said pulse representations when identical maintaining one or the other of said gates in one condition of conductance but when non-identical maintaining both gates in the reverse condition, an electronic binary element set to one state on said reverse condition of said gates and an indicator operated by said element.

3. In a computer having a keyboard, an intermediate storage device into which information is entered through said keyboard, and a permanent storage device into which information is shifted from said intermediate storage device, the combination of key controlled means for so shifting said information, a comparison circuit comprising a pair of coincidence gates, key controlled means for transmitting in synchronism to one of said gates a pulse representation of the information in each storage device and to the other gate an electronically inverted pulse representation of said information, said pulse representations when identical, maintaining one or the other of said gates in one condition of conduction, but when non-identical maintaining both gates in the opposite condition, a flip-flop set to one state on the said opposite condition of said gates and an indicator operated on setting of said flip-flop.

4. In a computer having a keyboard, an intermediate storage device into which information is entered through said keyboard, and a permanent storage device into which information is shifted from said intermediate storage device, the combination of key controlled means for so shifting said information, a comparison circuit comprising a pair of coincidence gates having a common anode output, key controlled means for transmitting in synchronism to one of said gates a pulse representation of the information in each storage device and to the other gate an electronically inverted pulse representation of said information, said pulse representations when identical, maintaining one or the other of said gates conducting and their output low but when non-identical cutting off both gates to effect a high output, a flip-flop set to one state by a high output of said gates, an indicator operated on setting of said flip-flop, and automatic means for resetting the flip-flop to the opposite states at an appropriate future time in the operation of the computer.

5. Means for checking computer inputs by successively entering the same number including a keyboard through which the numbers are entered, an intermediate storage device, and a permanent storage device into which numbers are shifted from the intermediate storage device, key controlled means for shifting the number from the intermediate storage device to the permanent storage device after the same has been entered through the keyboard once, a comparison circuit, key controlled means for synchronously shifting numbers in pulse form from the intermediate storage device and from the permanent storage device to the comparison circuit after the number has been entered through the keyboard twice, a flip-flop set to one state by said comparison device on the occurrence of a non-comparison between the numbers transmitted thereto in pulse form from the two sources and an indicator operated by said flip-flop when the latter is so set.

6. In a keyboard set-up checking arrangement for a computer having a keyboard, an intermediate storage device into which information is transmitted from the keyboard, a permanent storage device into which the information is shifted from said intermediate storage device, the combination of key controlled means for so shifting said information after it has been entered into the intermediate storage device a first time, a comparison circuit, key controlled means for synchronously shifting the information in pulse form from the permanent and intermediate storage devices to the comparison circuit after it has been entered into the intermediate storage device a second time, said comparison circuit providing a signal in the event of a non-comparison, and an indicator operated under control of said signal.

7. The combination according to claim 6, wherein the comparison circuit comprises a pair of electronic coincidence gates having a common anode output which assumes a high potential only when both gates are cut off, the information from both sources being applied in pulse form to the inputs of one gate, and electronic inversions of said information pulses being applied to the other gate.

8. In a keyboard set-up checking arrangement for a computer having a keyboard, an intermediate storage device into which information is transmitted from the keyboard, a permanent storage device into which the information is shifted from said intermediate storage device, the combination of key controlled means for so shifting said information after it has been entered into the intermediate storage device a first time, a pair of dual input electronic coincidence gates having a common anode output which assumes a high potential only when both gates are cut off, inverter tubes in the input lines of one gate, key controlled means for synchronously shifting the information in pulse form from said storage devices to the inputs of said inverters and also to the inputs of the other gate, a non-comparison cutting off both gates, a stable trigger pair set to one state on the occurrence of a high potential at the output of the gates, an indicator operated by said trigger pair when the latter is in said one state, and automatic means for resetting the trigger pair at a predetermined later time in the operation of the computer.

References Cited in the file of this patent

UNITED STATES PATENTS

| | | |
|---|---|---|
| 2,393,386 | Leathers | Jan. 22, 1946 |
| 2,410,669 | Lynn | Nov. 5, 1946 |
| 2,514,054 | Hallden | July 4, 1950 |
| 2,532,546 | Forbes | Dec. 5, 1950 |
| 2,539,043 | Verneaux | Jan. 23, 1951 |
| 2,572,132 | Giroud | Oct. 23, 1951 |
| 2,573,356 | Rabenda | Oct. 30, 1951 |
| 2,580,768 | Hamilton | Jan. 1, 1952 |
| 2,599,392 | Kille | June 3, 1952 |
| 2,611,026 | Blanton et al. | Sept. 16, 1952 |

FOREIGN PATENTS

| | | |
|---|---|---|
| 595,556 | Great Britain | Dec. 9, 1947 |